United States Patent [19]

Jäger et al.

[11] 4,286,879

[45] Sep. 1, 1981

[54] DEVICE, PARTICULARLY FOR THE DIGITAL MEASURING OF FORCE

[76] Inventors: Gerd Jäger, Leninring 26; Wolfgang Bernuth, Rudolf-Breitscheid-Str. 11, both of 63 Ilmenau; Klaus Irrgang, Mühlgraben 10, 6306 Geraberg; Hans-Joachim Wendt, Thalheimstr. 4a, 8122 Radebeul; Siegfried Honecker, Pestitzer Weg 14, 8020 Dresden, all of German Democratic Rep.

[21] Appl. No.: 54,599

[22] Filed: Jul. 3, 1979

[30] Foreign Application Priority Data

Jul. 11, 1978 [DD] German Democratic Rep. ... 206632

[51] Int. Cl.³ ............................................. G01B 9/02

[52] U.S. Cl. .................................. 356/358; 356/35.5; 177/229

[58] Field of Search ...................... 356/357, 358, 35.5; 73/800; 177/229

[56] References Cited

U.S. PATENT DOCUMENTS

| 1,159,416 | 11/1915 | Powers | 177/229 |
|---|---|---|---|
| 3,622,244 | 11/1971 | Chitayat | 356/358 |

Primary Examiner—Conrad J. Clark
Attorney, Agent, or Firm—Michael J. Striker

[57] ABSTRACT

A measuring device, particularly for the measurement of force, has a tilt-invariant interferometer attached to a bifurcated deformation body which consists of a base with one or several diaphragms attached thereon. The interference fringes are counted photoelectrically.

84 Claims, 3 Drawing Figures

Schnitt A-A

DEVICE, PARTICULARLY FOR THE DIGITAL MEASURING OF FORCE

BACKGROUND OF THE INVENTION

The invention relates to a device, particularly for the digital measuring of force. Furthermore, with this device, measurement can be made also of the dimension of travel and of dimensions that can be derived from force and travel.

As per DDR Letters Patent No. 94,905, a device for the direct digital measuring of force is known, containing a measuring element which consists of several transparent plates firmly fastened to each other. Force, as measured dimension, acts onto one plate of the measuring element, the so-called diaphragm. The air gap formed by this diaphragm and the plate located opposite to it, is so shaped, that on deflection of the diaphragm and on transmission of parallel monochromatic light through the measuring element, an interferential splitting of the torsional fringes will occur. With the aid of photoelectric receivers, certain points at the interferential splitting of the torsional fringes will be scanned. Optimal conditions will result, when the interferential fringe will rotate from an inclined initial position at the origin of the measuring range, to a position, symmetrical to the initial position, at the end of the measuring range. By calibrating the receiver in the y direction, the storage volume of the available characters, appurtenant to the measuring range, is determined. By distance calibrating of the receivers in the x direction, the desired phase position of the output signals can be achieved.

In this device, the storage size of the available characters allotted to the measuring range is determined by the distance of the scanning point of the receiver to the x axis. This allotment will thus change when, for instance by fluctuations in temperature, the relative positions between measuring element, the optical image system and the photoelectrical receiver are being changed.

By reason of distribution of the torsional fringes, the distance of interference fringes will remain constant in the x direction, but will change however in the y direction, depending upon the value of the dimension measured. Thus, the number of interference fringes that can be evaluated, is limited by that distance of the interference fringes which can still be evaluated photoelectrically.

If the force acts upon the diaphragm from a point out-of-center, torsion of the diaphragm will occur, whereby a change occurs in the distance of the interference fringes in the x direction, and thus also in the phase difference between the output signals.

The firmly connected plates forming the measuring element must be made of a high-quality and transparent material.

Furthermore, the plates must have a high surface quality and dimensional stability, in order to achieve the desired geometry of the air gap.

It is not possible to produce the distortion body from one piece, since the surfaces enclosing the air gap must be polished.

SUMMARY OF THE INVENTION

With the solution as per invention, it is possible to especially maintain constant the distance of the interference fringes along the measuring range, however, to adjust it as desired wherein relative changes of the position between the measuring element (deformation body), the optical image system and the photoelectric receiver, will have no influence upon the allotment of the volume of the character storage to the measuring range covered, and wherein torsioning of the diaphragm will not have an influence upon the phase difference between the output signals. The device allows using non-transparent material as material for the deformation body. The deformation body is distinguished by simple construction. Furthermore, it should be made possible to economize on expensive material for the deformation body, to allow varying in a simple manner the measuring range, and to allow, by optical means, independence from corner loads.

The invention is based upon the task of creating a device, particularly for the digital measuring of force, having measuring times and high resolutions, and which will remain functional also under operating conditions.

As per invention this task is solved by locating a tilt-invariant interferometer of a bifurcated deformation body.

The deformation body may be designed also in the shape of an annular spring or a frame spring.

The bifurcated deformation body consists of a flexurally rigid base body and one or several diaphragms, with the base body, at one point, being in fixed attachment on the frame.

Base body and diaphragm may be made in a simple manner from one piece, for example from high-quality spring steel or from quartz.

There are several possibilities, to economize on high-quality material for the deformation body. Either, the diaphragms only are made of high quality material and are firmly connected with the flexurally rigid base body, or additional inserts are fitted into the diaphragm, shaped in such a way that they will take the larger part of the deformation. In the latter case, only the inserts have to be made from high-quality deformation material. It has proven of particular advantage to produce the inserts from crystalline quartz and the base body as well as the diaphragm from siliceous material.

If several diaphragms are arranged, the diaphragms will be firmly connected to each other at their free ends by a coupling element. The force to be measured may be linked to one of the outer diaphragms or at the coupling element.

In the arrangement with several diaphragms, the possibility exists of simultaneously using the diaphragm as parallel linkage for the force input system. The load column is herein linked directly to the diaphragm. The force is transmitted to the deformation body at one link point. This link point must be of such design that it will not transfer any momentums. At the other point, the load column is linked to a diaphragm by a kinematic guide. The kinematic guide must be of such design that, as far as possible, only negligible momentums will be transmitted.

By a variation of the distance of the tilt-invariant reflector of the diaphragm to the clamping point of the diaphragm, the desired measuring range can be set.

By locating several load columns at varying distances, a multi-range force-measuring system can be obtained in a simple manner by changing the position of the weighing dish.

The optical components of an interferometer of the known type, tilt-invariant, are firmly attached to the deformation body. A Michelson interferometer can, for instance, be used, with a beam deflection by tilt-invariant reflectors (f.i. corner prisms) in its interferometer arms. The optical splitter, both interferometer mirrors and a tilt-invariant reflector are in fixed attachment to the base body. It is of advantage herein, to attach the interferometer mirrors to the optical splitter, as this can be easily realized in manufacture and will result in a sturdy design. The other tilt-invariant reflector is in firm attachment to the diaphragm. On deflection of the diaphragm due to the action of the force, it is only the length of optical travel in the arm of the interferometer that will change, and not the direction of the beams incident into the tilt-invariant reflector and also not the direction of beams reflected back by the reflector. The distance of the interference fringes is determined by the angular position of the two interferometer mirrors attached to the optical splitter.

Parallel monochromatic light is conducted onto the optical splitter with the aid of a source of monochromatic light and of a condenser. Splitting into two partial bundles ensues at the optical splitter. The two partial bundles are, in the respective instance, deflected by the tilt-invariant reflectors and, reaching the interferometer mirrors located at the splitter cube are reflected by the former, pass once more the tilt-invariant reflectors, are united again at the optical splitter and interfere. On deflection of the diaphragm due to the action of the force, the variance in the path of the interfering bundles will change, and the interference fringes will drift outwards.

The number of interference fringes drifting towards at a given variation in the measured value, will depend upon the distance of the tilt-invariant reflector of the diaphragm from the center of the deflection.

A lens serves to form the image of the interference fringes on the photoelectric receivers. The photoelectric receivers need be calibrated merely in the direction vertical to the interference fringes in order to obtain the desired phase differences. In order to implement the incremental method, the image of the interference is photoelectrically scanned at two locations, phase-displaced at 90° to each other.

In order to limit the corner-load sensitivity, the two tilt-invariant reflectors are, in the respective case, arranged at the two diaphragms in a plane parallel to the y-z plane and diametrical relative to the origin of the coordinates. The tilt-invariant reflectors should be arranged as closely as possible to the coupling element, and before the bending joints when viewed from the coupling element.

The novel features which are considered as characteristic for the invention are set forth in particular in the appended claims. The invention itself, however, both as to is construction and its method of operation, together with additional objects and advantages thereof, will be best understood from the following description of specific embodiments when read in connection with the accompanying drawings.

DESCRIPTION OF THE DRAWINGS

The invention is to be explained more closely using examples of realization. The relevant drawing shows.

DESCRIPTION OF THE PREFERRED EMBODIMENTS

Figure 1:
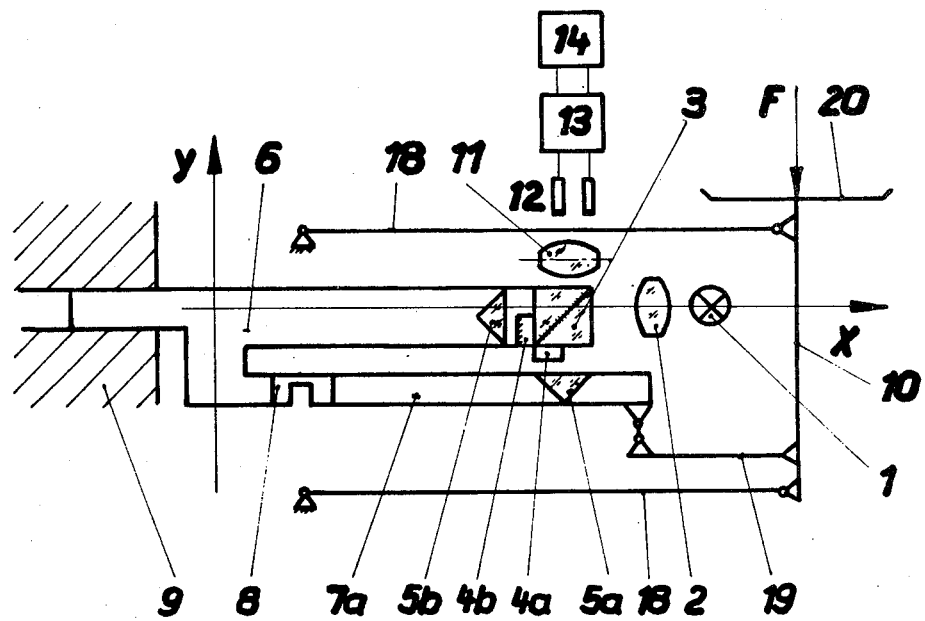
FIG. 1: Arrangement with base body and one diaphragm

As per FIG 1, the deformation body consists of the flexurally rigid base body 6, the diaphragm 7a and the firmly interposed intermediate part 8.

Base body 6 and diaphragm 7a are made of siliceous material, whilst the intermediate part 8 is made of quartz.

A groove is milled into the insert 8, so that this part will show the greatest proportion of the deformation. The base body 6 is held firm at one point in the frame 9. The optical splitter 3 and the tilt-invariant reflector 5b are firmly connected to the base body 6. The interferometer mirrors 4a and 4b are attached on the optical splitter 3. The tilt-invariant reflector 5a is firmly connected to the diaphragm 7a. Parallel monochromatic light is conducted to the optical splitter 3 with the aid of the source of monochromatic light 1 and the condenser 2. Splitting into two partial bundles ensues at the optical splitter 3. The two partial bundles are, in the respective instance, deflected by the tilt-invariant reflectors 5a and 5b and reach the interferometer mirrors 4a and 4b are reflected by these, pass once more the tilt-invariant reflectors 5a and 5b, are united again at the optical splitter 3 and interfere. By means of the lens 11, the interference image is projected onto the photoelectric receiver 12. Impulse-former stages 13 and a foward-reverse counter 14 are arranged thereafter. The force F takes the path via the force-input system consisting of weighing dish 20, load column 10, parallel linkage 18, and coupling element 19, onto the diaphragm 7a. With increasing force F, the diaphragm 7a will be deflected and the interference fringes will drift outwards at the photoelectric receivers 12. The number of the passing interference fringes is counted in the forward-reverse counter 14 and is a direct measurement of the value of the force F.

Figure 2:
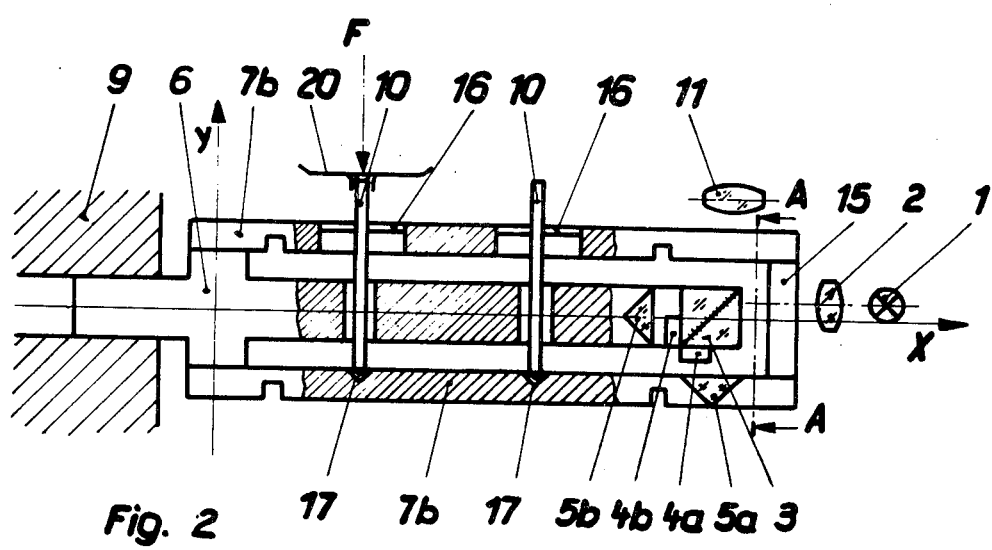
FIG. 2: Arrangement with base body and two diaphragms

As per FIG. 2, the ends of the diaphragm 7b are connected by the coupling element 15. The optical components of the interferometer are arranged in exactly the same manner as in the arrangement as per FIG. 1. Also the photoelectric evaluation will ensue in the same manner. The force F is transmitted via the load column 10 and by a thrust bearing 17 onto the lower diaphragm.

The load column 10 is linked to the upper diaphragm 7b by a kinematic guide 16. The upper and the lower diaphragm 7b also serve as parallel linkage 18. In the example as selected, two load columns 10 are provided, thus, by changing the location of the weighing dish 20 a dual-range force-measuring system is obtained.

Figure 3:
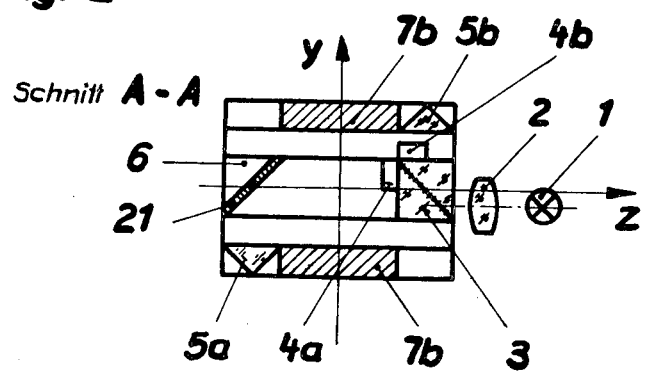
FIG. 3: Arrangement of the components of the interferometer in order to eliminate corner loads

FIG. 3 shows the section A-A through FIG. 2 in a varied arrangement of the optical parts of the interferometer. In this particular arrangement, causing an insensibility to corner loads, the one tilt-invariant reflector 5a is attached to the lower diaphragm 7a, and the other tilt-invariant reflector 5b to the upper diaphragm 7b. The tilt-invariant reflectors 5a and 5b are arranged in a plane parallel to the plane y-z, diametrically in respect of the origin of the coordinates, and at the smallest possible distance in the x direction from the coupling element 15. For the beam deflection, an additional deflector mirror 21 is provided in one interferometer arm.

We claim:

1. A measuring device, particularly for the digital measurement of force, comprising a monochromatic light source; sensing means; a deformable body; at least one diaphragm operatively connected to said body; an optical splitter affixed to said body and adapted to receive light from said source; two interometer mirrors connected to said body; a first tilt-invariant reflector affixed to said body; a second tilt-invariant reflector affixed to said diaphragm; and force-receiving means operatively connected to said diaphragm so that the force to be measured is transmitted to said diaphragm causing the light from said source to be phase-shifted in said optical splitter, said mirrors and said first and second tilt-invariant reflectors in response to the displacement of said diaphragm under action of said force and thereupon detected by said sensing means.

2. A measuring device as defined in claim 1, further including a frame, said deformable body having a base rigidly mounted in said frame.

3. A measuring device as defined in claim 1, further including a second diaphragm, said second diaphragm being vertically spaced from said one diaphragm, said one diaphragm and said second diaphragm each having a free end.

4. A measuring device as defined in claim 3, further including at least one coupling element interconnecting said free ends of said one and second diaphragms.

5. A measuring device as defined in claim 4, wherein said force-receiving means comprise at least one load column, at least one kinematic guide, and at least one momentum-free coupling, said load column being linked to either of said diaphragms by said kinematic guide, and said load column being linked to the other of said diaphragms by said momentum-free coupling.

6. A measuring device of claim 5, wherein said force-receiving means further comprise at least one additional load column located at a predetermined additional site on said diaphragms.

7. A measuring device as defined in claim 1, wheren the interferometer mirrors are rigidly connected to the optical splitter.

8. A measuring device as defined in claim 4, wherein the interferometer mirrors are rigidly connected to the optical splitter.

9. A measuring device as defined in claim 5, wherein the interferometer mirrors are rigidly connected to the optical splitter.

10. A measuring device as defined in claim 6, wherein the interferometer mirrors are rigidly connected to the optical splitter.

11. A measuring device as defined in claim 4, wherein said first tilt-invariant reflector is located on said one diaphragm, said second tilt-invariant reflector is located on said second diaphragm diametrically opposite said first tilt-invariant reflector so that corner load effects are minimized, said reflectors being arranged as close to said coupling element as possible.

12. A measuring device as defined in claim 5, wherein said first tilt-invariant reflector is located on said one diaphragm, said second tilt-invariant reflector is located on said second diaphragm diametrically opposite said first tilt-invariant reflector so that corner load effects are minimized, said reflectors being arranged as close to said coupling element as possible.

13. A measuring device as defined in claim 6, wherein said first tilt-invariant reflector is located on said one diaphragm, said second tilt-invariant reflector is located on said second diaphragm diametrically opposite said first tilt-invariant reflector so that corner load effects are minimized, said reflectors being arranged as close to said coupling element as possible.

14. A measuring device as defined in claim 7, wherein said first tilt-invariant reflector is located in said one diaphragm, said second tilt-invariant reflector is located on said second diaphragm diametrically opposite said first tilt-invariant reflector so that corner load effects are minimized, said reflectors being arranged as close to said coupling element as possible.

15. A measuring device as defined in claim 8, wherein said first tilt-invariant reflector is located in said one diaphragm, said second tilt-invariant reflector is located on said second diaphragm diametrically opposite said first tilt-invariant reflector so that corner load effects are minimized, said reflectors being arranged as close to said coupling element as possible.

16. A measuring device as defined in claim 9, wherein said first tilt-invariant reflector is located on said one diaphragm, said second tilt-invariant reflector is located on said second diaphragm diametrically opposite said first tilt-invariant reflector so that corner load effects are minimized, said reflectors being arranged as close to said coupling element as possible.

17. A measuring device as defined in claim 10, wherein said first tilt-invariant reflector is located on said diaphragm, said second tilt-invariant reflector is located on said second diaphragm diametrically opposite said first tilt-invariant reflector so that corner load effects are minimized, said reflectors being arranged as close to said coupling element as possible.

18. A measuring device as defined in claim 1, further comprising an intermediate element inserted between said one diaphragm and said body.

19. A measuring device as defined in claim 2, further comprising an intermediate element inserted between said one diaphragm and said body.

20. A measuring device as defined in claim 5, further comprising an intermediate element inserted between said one diaphragm and said body.

21. A measuring device as defined in claim 5, further comprising an intermediate element inserted between said one diaphragm and said body.

22. A measuring device as defined in claim 6, further comprising an intermediate element inserted between said one diaphragm and said body.

23. A measuring device as defined in claim 7, further comprising an intermediate element inserted between said one diaphragm and said body.

24. A measuring device as defined in claim 8, further comprising an intermediate element inserted between said one diaphragm and said body.

25. A measuring device as defined in claim 9, further comprising an intermediate element inserted between said one diaphragm and said body.

26. A measuring device as defined in claim 10, further comprising an intermediate element inserted between said one diaphragm and said body.

27. A measuring device as defined in claim 11, further comprising an intermediate element inserted between said one diaphragm and said body.

28. A measuring device as defined in claim 1, wherein the force to be measured is applied on one of the diaphragms.

29. A measuring device as defined in claim 2, wherein the force to be measured is applied on one of the diaphragms.

30. A measuring device as defined in claim 4, wherein the force to be measured is applied on one of the diaphragms.

31. A measuring device as defined in claim 10, wherein the force to be measured is applied on one of the diaphragms.

32. A measuring device as defined in claim 6, wherein the force to be measured is applied on one of the diaphragms.

33. A measuring device as defined in claim 7, wherein the force to be measured is applied on one of the diaphragms.

34. A measuring device as defined in claim 8, wherein the force to be measured is applied on one of the diaphragms.

35. A measuring device as defined in claim 9, wherein the force to be measured is applied on one of the diaphragms.

36. A measuring device as defined in claim 10, wherein the force to be measured is applied on one of the diaphragms.

37. A measuring device as defined in claim 11, wherein the force to be measured is applied on one of the diaphragms.

38. A measuring device as defined in claim 4, wherein the force to be measured is applied to said one of the coupling elements.

39. A measuring device as defined in claim 5, wherein the force to be measured is applied to said one of the coupling elements.

40. A measuring device as defined in claim 6, wherein the force to be measured is applied to said one of the coupling elements.

41. A measuring device as defined in claim 7, wherein the force to be measured is applied to said one of the coupling elements.

42. A measuring device as defined in claim 8, wherein the force to be measured is applied to said one of the coupling elements.

43. A measuring device as defined in claim 9, wherein the force to be measured is applied to said one of the coupling elements.

44. A measuring device as defined in claim 10, wherein the force to be measured is applied to said one of the coupling elements.

45. A measuring device as defined in claim 11, wherein the force to be measured is applied to said one of the coupling elements.

46. A measuring device as defined in claim 1, wherein at least one diaphragm is composed of a siliceous material.

47. A measuring device as defined in claim 2, wherein at least one diaphragm is composed of a siliceous material.

48. A measuring device as defined in claim 4, wherein at least one diaphragm is composed of a siliceous material.

49. A measuring device as defined in claim 5, wherein at least one diaphragm is composed of a siliceous material.

50. A measuring device as defined in claim 6, wherein at least one diaphragm is composed of a siliceous material.

51. A measuring device as defined in claim 7, wherein at least one diaphragm is composed of a siliceous material.

52. A measuring device as defined in claim 8, wherein at least one diaphragm is composed of a siliceous material.

53. A measuring device as defined in claim 9, wherein at least one diaphragm is composed of a siliceous material.

54. A measuring device as defined in claim 10, wherein at least one diaphragm is composed of a siliceous material.

55. A measuring device as defined in claim 11, wherein at least one diaphragm is composed of a siliceous material.

56. A measuring device as defined in claim 18, wherein the intermediate element is composed of crystalline quartz.

57. A measuring device as defined in claim 19, wherein the intermediate element is composed of crystalline quartz.

58. A measuring device as defined in claim 20, wherein the intermediate element is composed of crystalline quartz.

59. A measuring device as defined in claim 21, wherein the intermediate element is composed of crystalline quartz.

60. A measuring device as defined in claim 22, wherein the intermediate element is composed of crystalline quartz.

61. A measuring device as defined in claim 23, wherein the intermediate element is composed of crystalline quartz.

62. A measuring device as defined in claim 24, wherein the intermediate element is composed of crystalline quartz.

63. A measuring device as defined in claim 25, wherein the intermediate element is composed of crystalline quartz.

64. A measuring device as defined in claim 26, wherein the intermediate element is composed of crystalline quartz.

65. A measuring device as defined in claim 27, wherein the intermediate element is composed of crystalline quartz.

66. A measuring device as defined in claim 4, wherein at least one coupling element is composed of siliceous material.

67. A measuring device as defined in claim 5, wherein at least one coupling element is composed of siliceous material.

68. A measuring device as defined in claim 6, wherein at least one coupling element is composed of siliceous material.

69. A measuring device as defined in claim 7, wherein at least one coupling element is composed of siliceous material.

70. A measuring device as defined in claim 8, wherein at least one coupling element is composed of siliceous material.

71. A measuring device as defined as claim 9, wherein at least one coupling element is composed of siliceous material.

72. A measuring device as defined in claim 10, wherein at least one coupling element is composed of siliceous material.

73. A measuring device as defined in claim 11, wherein at least one coupling element is composed of siliceous material.

74. A measuring device as defined in claim 1, wherein at least one diaphragm is composed of crystalline quartz.

75. A measuring device as defined in claim 3, wherein at least one diaphragm is composed of crystalline quartz.

76. A measuring device as defined in claim 4, wherein at least one diaphragm is composed of crystalline quartz.

77. A measuring device as defined in claim 5, wherein at least one diaphragm is composed of crystalline quartz.

78. A measuring device as defined in claim 6, wherein at least one diaphragm is composed of crystalline quartz.

79. A measuring device as defined in claim 7, wherein at least one diaphragm is composed of crystalline quartz.

80. A measuring device as defined in claim 8, wherein at least one diaphragm is composed of crystalline quartz.

81. A measuring device as defined in claim 9, wherein at least one diaphragm is composed of crystalline quartz.

82. A measuring device as defined in claim 10, wherein at least one diaphragm is composed of crystalline quartz.

83. A measuring device as defined in claim 11, wherein at least one diaphragm is composed of crystalline quartz.

84. A measuring device as defined in claim 1, wherein the deformable body is composed of quartz.

* * * * *